Figures 1, 2:
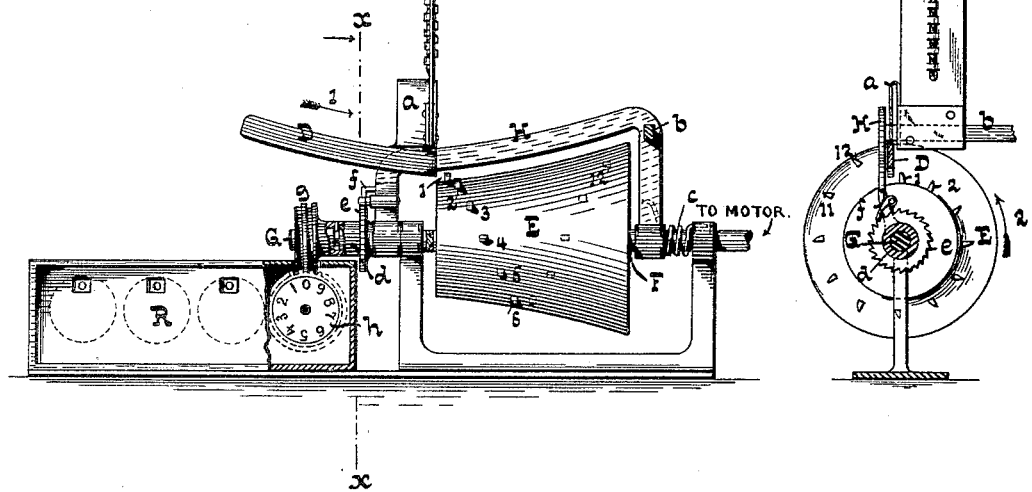

(No Model.) 3 Sheets—Sheet 1.

W. H. BRISTOL.
ELECTRIC METER.

No. 439,381. Patented Oct. 28, 1890.

WITNESSES:

INVENTOR
William H. Bristol
BY A. Faber du Faur Jr.
his ATTORNEY

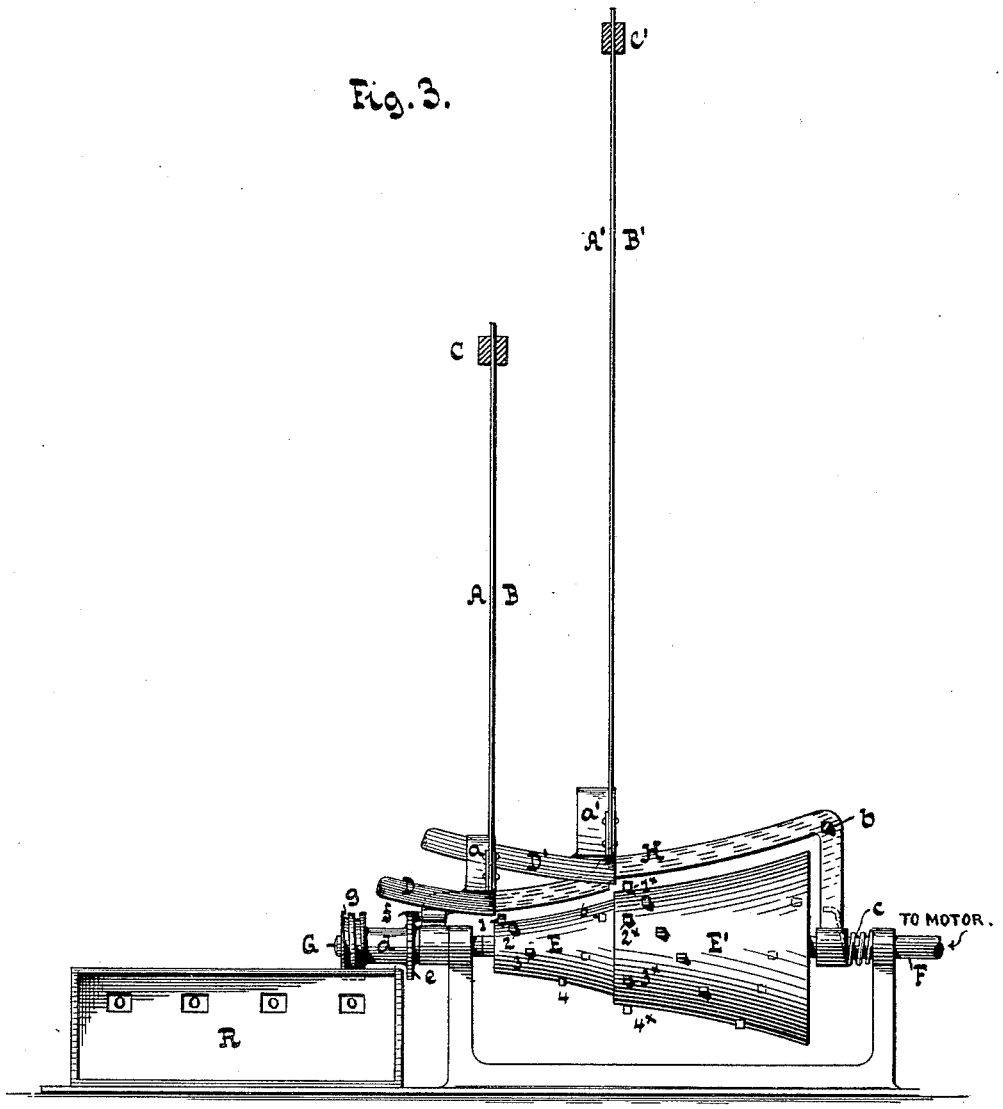

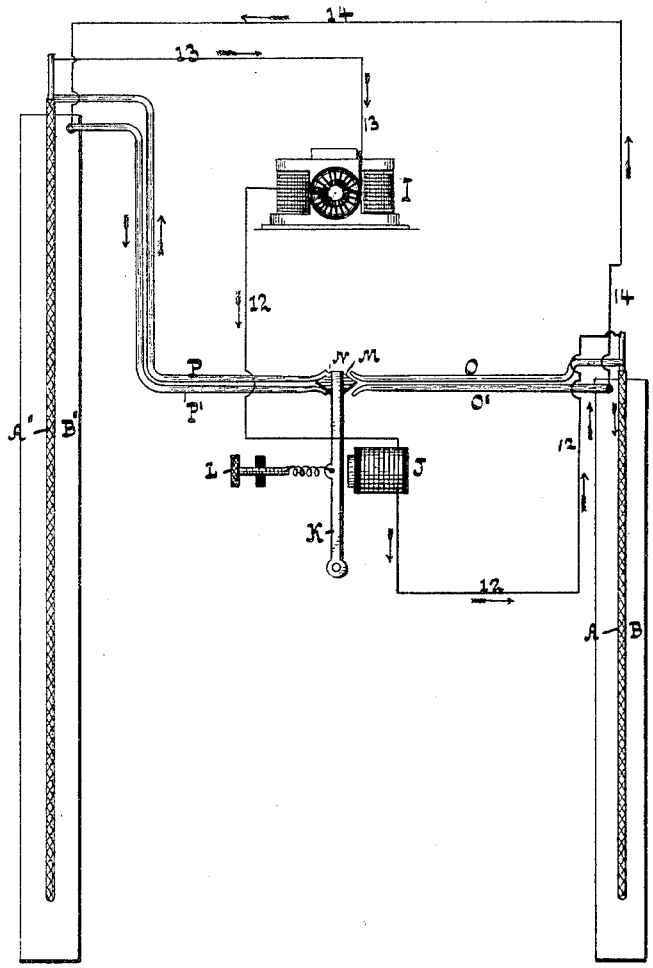

UNITED STATES PATENT OFFICE.

WILLIAM H. BRISTOL, OF HOBOKEN, NEW JERSEY.

ELECTRIC METER.

SPECIFICATION forming part of Letters Patent No. 439,381, dated October 28, 1890.

Application filed April 10, 1890. Serial No. 347,330. (No model.)

*To all whom it may concern:*

Be it known that I, WILLIAM H. BRISTOL, a citizen of the United States, and a resident of Hoboken, in the county of Hudson and State of New Jersey, have invented certain new and useful Improvements in Electric Meters, of which the following is a specification.

My invention has reference to apparatus for the measurement of electric currents, and especially to that class of meters in which a registering mechanism or counter is operated to record the quantity of current passing through the meter.

It consists, essentially, in combining with a bar or needle, which is deflected by the current, a device adapted to engage with a movable arm or extension carried by said bar or needle and to vibrate it transversely to the plane of deflection of the bar or needle by the current, said transverse vibrations being transmitted and converted by purely mechanical means to actuate the mechanism of a register or counter. Furthermore, when it is necessary to provide a meter which will measure and register currents in which the variation in quantity is considerable, I combine two or more bars, needles, or galvanometers, differing in sensitiveness or range, and all adapted to actuate one and the same registering mechanism or counter. Suitable electrical connections and devices are provided, whereby the current is automatically caused to pass through one bar, needle, or galvanometer or the other, according to the strength at the time.

In the accompanying drawings, Figure 1 represents a sectional elevation of a meter constructed according to my invention. Fig. 2 is a vertical section thereof in the plane $x$ $x$, Fig. 1. Fig. 3 is an elevation of a meter provided with two deflecting-bars, the various electrical connections and devices being omitted. Fig. 4 is a diagram illustrating the arrangement of the circuits of the apparatus illustrated in Fig. 3.

Similar letters and figures indicate corresponding parts.

In the drawings, referring at present to Figs. 1 and 2, the letters A and B designate the component parts of a device which is deflected from its normal position by the current to an extent corresponding to the strength of the same. This device may be of any construction suitable for the purpose. In the example here illustrated I have made use of a differential expansion-bar, composed of two elements A and B, made of the same metal, or of two metals having substantially the same coefficient of expansion, said elements being of such general cross-section that the element A is heated to a greater degree by the passage of the current than the element B, whereby a difference in expansion of the two elements is produced with a resulting deflection corresponding to such difference. The general construction of this differential expansion-bar is described in United States Letters Patent No. 383,095, granted to me May 22, 1888, and need not be more fully described here, with the exception that as an improvement upon the bar shown in my said prior patent I provide the flat element B with loops punched out from opposite sides, the loops on one side, however, being deeper than on the other, so that when the element A is passed through and secured in said loops by pressure it lies to one side of the center line of element B.

The elements A and B are connected in any suitable manner with the wires 10 and 11 of the circuit, the current of which is to be measured and registered, or they may be connected with the wires of a shunt-circuit, if so desired. A suitable bracket or clamp C is used to suspend the bar in the proper position, such bracket or clamp being secured to the casing. (Not shown.)

In the drawings I have shown the two elements A and B of the bar so arranged that said bar will be deflected by the current in the direction of arrow 1, Fig. 1.

At the lower end of the bar A B an arm or extension D is attached by means of a spring-plate $a$, said arm or extension being in a plane parallel with the plane of motion of the bar, and in virtue of its spring-connection with the bar it is capable of being moved or vibrated laterally—*i. e.*, at right angles to the plane of deflection of the bar.

E designates a drum rigidly mounted upon a shaft F, which has one bearing in the frame of the apparatus and an end bearing in a rigid stud G. This shaft, and consequently the drum, is uniformly rotated in the direction of arrow 2, Fig. 2, by a suitable motor or clock movement, which latter is omitted in the drawings. The surface of the drum and the lower edge of the arm or extension D are of such general configuration that the arm will move across the surface of the drum approximately parallel thereto. Upon the drum are fixed a number of pins or tappets 1 2 3, &c., which are arranged to engage with the arm or extension D in its movement across the drum and to vibrate or deflect the same, the said pins or tappets being so distributed that no two lie on one and the same longitudinal element of the drum. Consequently the greater the deflection of the bar the more frequently the arm or extension is vibrated.

At the rear of the extension or arm D is located a frame H, journaled to the shaft F and stud G and normally held against a stop $b$ in a plane parallel with the arm or extension D by a spring $c$. The lower edge of the frame is above the lower edge of the arm or extension D, so that it is above the path of the pins or tappets on the drum E. The arm or extension, when vibrated by the pins or tappets, impinges upon the swinging frame H, and its motion is imparted to the latter. On the release of the arm or extension both the latter and the frame return to their normal positions.

On the stud G is mounted a sleeve $d$, having thereon a ratchet-wheel $e$, which is engaged by a pawl $f$, carried by the swinging frame, and turned through one tooth at each vibration of the said frame. At the opposite end of the sleeve is secured a worm $g$, which engages with a worm-wheel $h$ of the counter or register R to record the number of vibrations of the swinging frame H. It is evident, however, that any other suitable mechanical means could be employed to transmit the lateral movement of the arm or extension D to the register, and therefore I do not wish to confine myself to the specific means shown and described.

In some cases, where it is desired to increase the range of the instrument, I make a compound meter, both bars of which ultimately actuate the same register, and suitable connections and devices are made use of to automatically cause the current to pass through one bar or the other, according to the strength of the current at the time.

Referring to Fig. 3, A B represents the more sensitive bar or galvanometer, and A' B' represents the less sensitive bar or galvanometer, each being provided with an extension or arm D D', adapted to be engaged, respectively, by the drums E E', arranged in line and secured to a common shaft F. The drum E' starts with a sufficient number of pins or tappets to properly indicate the current when switched from the bar A B to the bar A' B'.

In Fig. 4 I have shown a diagram of the electrical connections and devices used for automatically causing the current to pass through one bar or the other. Referring to this figure, A B and A' B' represent the two differential expansion-bars. I is the dynamo or other source of electricity, the current of which is to be measured. J is an electro-magnet, K its swinging armature, and L a device for placing the armature under tension and for regulating said tension.

On the outer end of the armature are formed two contacts M and N, which play, respectively, between the opposite ends of two heavy conductors O O' and P P'. The conductors O O' connect, respectively, with the two elements A B of one expansion-bar, and the conductors P P' with the corresponding elements of the second bar A' B'. These conductors are of such cross-section as to offer little resistance to the passage of the current when compared to the elements A B and A' B'. The element A of bar A B is connected with the coils of the electro-magnet J by wire 12, the opposite end of said coil being connected with one pole of the dynamo I. The opposite pole of the dynamo is connected with the element A' of bar A' B' by wire 13. The element B of bar A B is connected with element B' of bar A' B' by wire 14. The contact N normally closes the circuit through P P', and the tension on the armature is at the outset so regulated by device L that when the strength of the current exceeds the limit set for bar A B the armature K is attracted by the electro-magnet to close the circuit through M and the conductors O O'.

The current from the dynamo, when the parts are in the position shown in Fig. 4, passes through bar A B as follows: from the dynamo over wire 12, through the coils of electro-magnet J, elements A and B of bar A B over wire 14 to element B' of bar A' B', through the conductors P P' and contact N, and over wire 13 to the dynamo, whereby the bar A B is deflected. The resistance offered by the elements A' B' to the current being very great when compared with that of the conductors P P' no appreciable current flows through the said bar. Consequently it is not deflected. If now the strength of the current becomes such as to exceed the range of the bar A B, the armature K is attracted by the the electro-magnet J. The circuit is broken at N through conductors P P', and closed at M through conductors O O'. The current now flows as follows: from the dynamo over wire 12, through conductors O O' and contact M, elements A' B' of bar A' B', and over wire 13 to the dynamo, whereby the bar A' B' is deflected, while the bar A B is not appreciably affected.

From the above description it will be readily seen that the circuit is a continuous one.

Consequently "sparking" at the contacts M and N will not occur, whereby the danger of burning the same is averted.

Any well-known form of galvanometer can be substituted in place of the expansion-bars A B and A' B', and it is evident that three or more such bars or galvanometers could be individually actuated on the same principle.

What I claim as new, and desire to secure by Letters Patent, is—

1. In an electric meter, a deflecting-bar or its equivalent, an extension or arm carried by the same and capable of being moved in a direction transverse to the motion of the deflecting-bar, a rotary drum provided with tappets adapted to engage with the arm or extension to vibrate the same, a swinging frame engaged by the arm or extension, a register, and a connection between the latter and the swinging frame, substantially as described.

2. In an electric meter, a deflecting-bar or its equivalent, an extension or arm carried by the same and capable of being moved in a direction transverse to the motion of the deflecting-bar, a rotary drum provided with tappets adapted to engage with the arm or extension, a swinging frame, a rigid stud, a pawl carried by the swinging frame, and a sleeve provided with a ratchet-wheel engaged by the pawl and with a worm-wheel engaging the register, substantially as described.

3. The combination, with two galvanometers of different ranges, of a circuit-closer actuated by the current to establish the circuit through the galvanometer within whose range the existing strength of the current is included and to break the current through the remaining galvanometer, said circuit-closer being independent of the galvanometers, substantially as described.

4. In combination with two or more galvanometers of different ranges, of interpolated conductors, as O O' and P P', one set for each galvanometer offering less resistance than said galvanometers, and means whereby the current is caused to automatically close the circuit through one or the other of said conductors, substantially as described.

5. In combination with two or more galvanometers of different ranges, of the conductors O O' and P P', connecting with the respective galvanometers, the electro-magnet J, and armature K, contacts M N, carried by said armature, and electrical circuits, all substantially as and for the purpose set forth.

6. The combination, with two galvanometers of different ranges, of interpolated conductors offering less resistance than the respective galvanometers to which they are connected, a circuit-closer actuated by the current to break the electrical connection through the set of conductors connected to the galvanometer within whose range the strength of the current is included and closing the electrical connection through the other pair of conductors, substantially as described.

In testimony that I claim the foregoing as my invention I have signed my name, in presence of two witnesses, this 8th day of April, 1890.

WILLIAM H. BRISTOL.

Witnesses:
A. FABER DU FAUR,
CHAS. SIMPSON.